United States Patent [19]

Moerman

[11] 4,163,190

[45] Jul. 31, 1979

[54] APPARATUS FOR CONTROL OF ELECTRICAL CURRENT BY ELECTROMAGNETIC INDUCTION

[76] Inventor: Nathan A. Moerman, 7310 Maple Ave., Chevy Chase, Md. 20015

[21] Appl. No.: 849,149

[22] Filed: Nov. 7, 1977

Related U.S. Application Data

[62] Division of Ser. No. 762,896, Jan. 26, 1977, Pat. No. 4,112,347, which is a division of Ser. No. 635,007, Nov. 25, 1975, Pat. No. 4,020,440.

[51] Int. Cl.² ............................ G05F 1/04; G05F 7/00
[52] U.S. Cl. ............................................. 323/6; 323/9; 361/58; 361/87; 361/93
[58] Field of Search ................... 361/87, 93, 94, 126, 361/58; 323/6, 44, 48, 56, 57, 58, 82, 9

[56] References Cited

U.S. PATENT DOCUMENTS

| | | | |
|---|---|---|---|
| 3,681,679 | 8/1972 | Chung | 323/6 |
| 3,843,907 | 10/1974 | Genuit et al. | 361/87 |
| 3,932,791 | 1/1976 | Oswald | 323/6 |
| 4,045,823 | 8/1977 | Parton | 361/58 |

FOREIGN PATENT DOCUMENTS

165722 4/1955 Sweden ...................................... 323/56

*Primary Examiner*—Gerald Goldberg
*Attorney, Agent, or Firm*—Thomas O. Maser

[57] ABSTRACT

A direct current power apparatus for control of current amplitude during overload, short circuit, switching and similar events. During normal operating conditions, current flows substantially unaffected through the windings on a pair of commutated reactors. However, when current exceeds a predetermined value, reactor flux is varied to increase the counter electromotive force within the reactors to thereby limit the output current to a safe level.

4 Claims, 3 Drawing Figures

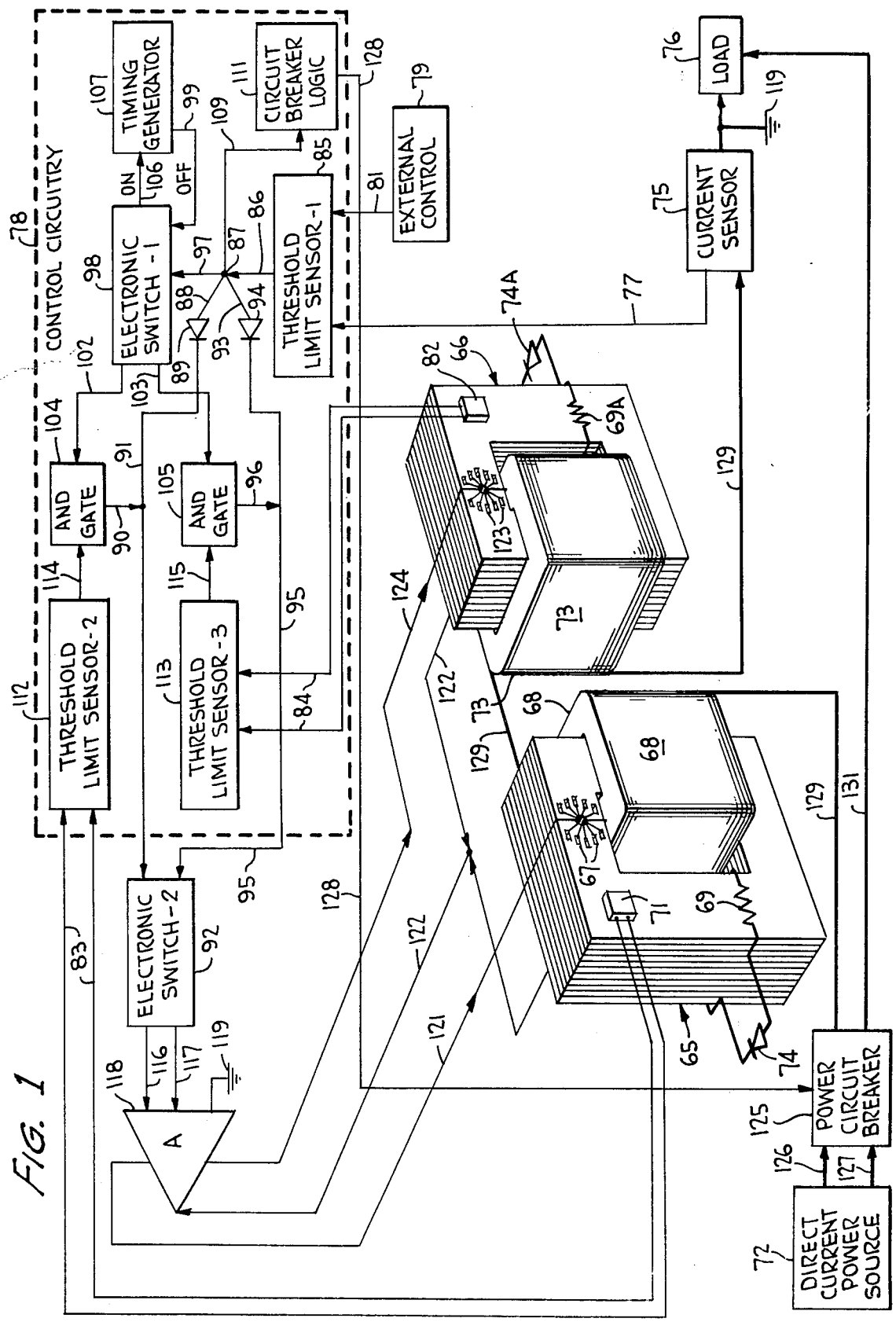

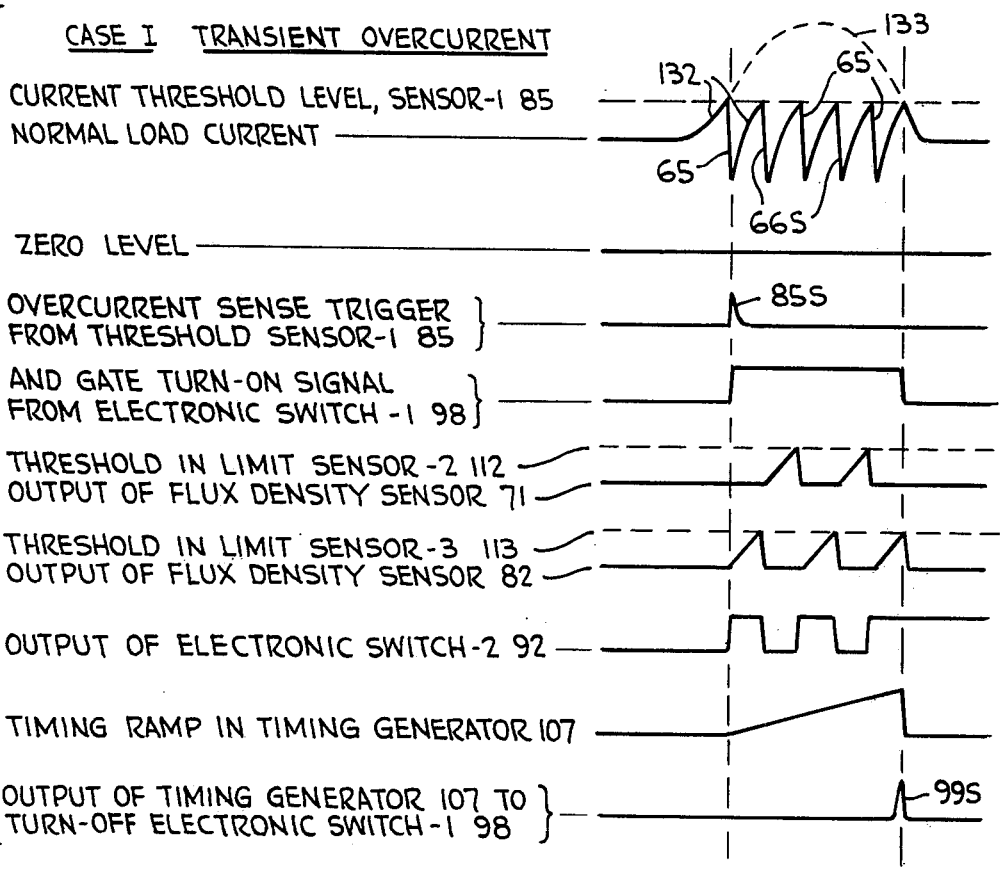
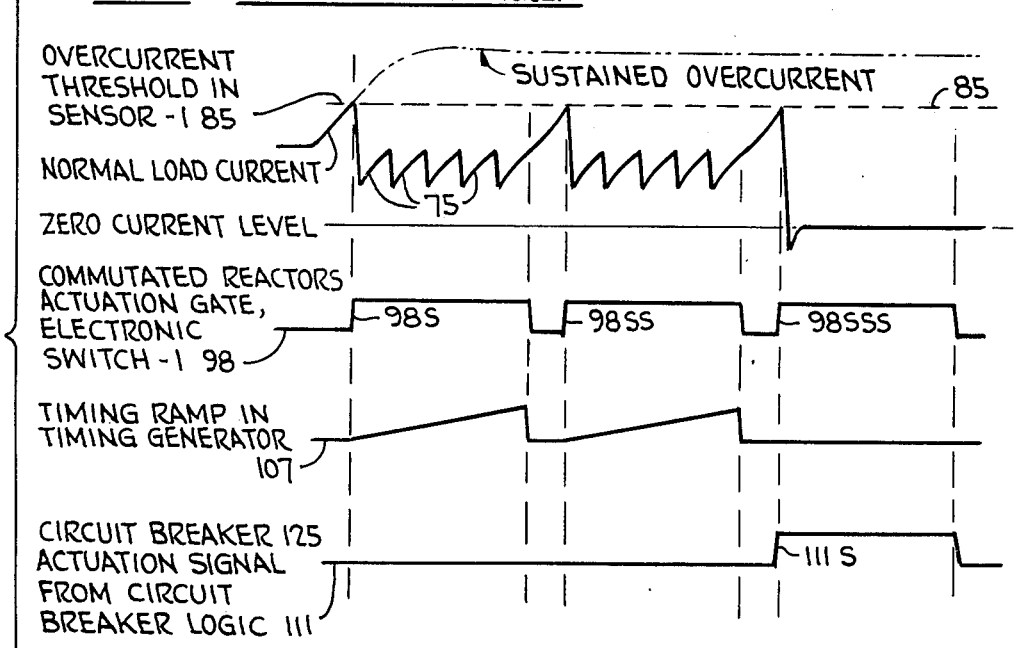

APPARATUS FOR CONTROL OF ELECTRICAL CURRENT BY ELECTROMAGNETIC INDUCTION

GOVERNMENT USE

The invention described herein may be manufactured and used by or for the government of the United States of America for governmental purposes without the payment to me of any royalties thereon.

This is a division of application Ser. No. 762,896 filed Jan. 26, 1977, now U.S. Pat. No. 4,112,347, which, in turn, was a division of application Ser. No. 635,007 filed Nov. 25, 1975, now U.S. Pat. No. 4,020,440.

RELATED PATENT

This invention is closely related to my U.S. Pat. No. 4,020,440 issued Apr. 26, 1977, which is incorporated by reference.

FIELD OF THE INVENTION

This invention relates to the field of control of electrical power, and more specifically to the control of direct current by static magnetic means.

SUMMARY

Control of magnetic flux in a closed magnetic path is accomplished by the progressive control of permeance in an assigned section of the path. Several configurations for continuous permeance control by progressive saturation and/or domain rotation are described in my related U.S. Pat. No. 4,020,440.

Utilizing this technology, I have developed a unique apparatus for the control of current in an electrical circuit by purely static magnetic means. More specifically, commutated magnetic paths configured as commutated reactors are used in this invention to control current amplitude in a direct current circuit in the event of overload, short circuit or switching operations.

It is, therefore, an object of this invention to provide electrical power control by controlled electromagnetic induction.

A still further object of this invention is to provide controlled electromagnetic induction means for direct to direct current power conversion and control.

A still further object of this invention is the elimination of moving parts and electrical controlling elements which have current and/or voltage limitations and fixed forward voltage drops.

A further object of this invention is the coupling to direct current sources and conversion to a power form for end utilization.

A still further object of this invention is to provide an electric power control means responsive to a sensed physical state, such as: voltage, current, power, temperature, pressure, strain, humidity, acidity, or the like.

Another object of this invention is to provide control of electrical power by electronic control of magnetic means in static configurations.

Still another object of this invention is the reduction or elimination of arcing at direct current power switches.

An object of this invention is the control of current in direct current circuits by commutated reactors with minimum power loss in the control means.

A further object of this invention is to provide means for the suppression of and the protection from power surges, transmission line fault, and transient phenomena.

The exact nature of this invention as well as other objects and advantages thereof will be readily apparent from consideration of the following specification relating to the annexed drawings in which:

BRIEF DESCRIPTION OF THE DRAWINGS

FIG. 1 shows a device for controlling current utilizing commutated reactors,

FIG. 2 is a time sequence chart for the operation of the reactors of FIG. 1 during a transient overcurrent, FIG. 3 is a time sequence chart for the operation of the reactors of FIG. 1 during a sustained overcurrent,

DESCRIPTION OF A PREFERRED EMBODIMENT

FIG. 1 shows a pair of commutated inductive reactors in a direct current power circuit. At high current levels, these reactors, when activated, generate an average counter electromotive force which opposes the direct current voltage source. This counter electromotive force limits the current in the direct current power circuit as may be required during an overload, a short circuit condition, or a desired switching operation. A simple derivative of this embodiment for alternating current power systems is evident.

The commutated inductive reactors 65 and 66 are identical in structure and operational capabilities. Referring to reactor 65 for purposes of explanation, the structure constitutes a closed magnetic path including a permeance control section 67 and a reactor winding 68, a reverse transient suppressor winding 69 and a flux density sensor 71. One lead 129 of the reactor winding 68 is connected to the power source 72 through power current breaker 125 and lead 126. The other lead of the reactor winding 68 is connected to a terminal of the companion reactor winding 73 of reactor 66, with the other lead of reactor winding 73 connected to the power circuit so as to connect the two reactor windings in series with the power circuit. A rectifier 74 is connected in the reverse transient suppressor winding 69 to conduct for the reverse voltage induced during the collapse of the field in the magnetic path. A flux density sensor 71 is joined to the magnetic core. The flux density sensor may be a Hall effect device or other flux density transducer. A current sensing resistive element 75 is connected between the reactors and a load 76.

A lead 77 connects current sensor 75 to a control circuit 78. An external control 79 can be supplied to control 78 through a lead 81. Also, as inputs to control 78 are the two flux density sensors 71 and 82, the latter being on reactor 66, through lead pairs 83 and 84, respectively.

Within the control circuitry 78, the output of the current sensor 75 through lead 77 is applied as an input to threshold limit sensor-1 85 to which also is applied as an input the output of external control 79 through lead 81. The output of threshold limit sensor-1 85 is applied through lead 86 to a junction 87. A first lead 88 with a diode 89 is connected between junction 87 and a first input lead 91 to electronic switch-2 92. A second lead 93 with a diode 94 is connected between junction 87 and a second input lead 95 to electronic switch-2 92. Diodes 89 and 94 are oriented to couple the two inputs to electronic switch-2 from a single signal source, junction 87. A third lead 97 from junction 87 is connected to be the turn-on lead to electronic switch-1 98. A second input lead 99 to electronic switch-1 98 is connected to be the turn-off lead thereto. A first output lead 102 from electronic switch-1 98 is connected as the input to AND gate 104. A second output lead 103 from electronic switch-1 98 is connected as the input lead to AND gate 105. A third output 106 from electronic switch-1 98 is connected to a timing generator 107 which has for its output the turn-off lead 99 to electronic switch-1 98. A fourth lead 109 from junction 87 is connected as the input to circuit breaker logic circuit 111.

Output lead pair 83 from flux density sensor 71 is connected as the input to a threshold limit sensor-2 112 and the output lead pair 84 from flux density sensor 82 is connected as the input to a threshold limit sensor-3 113. The output of threshold limit sensor-2 is connected through lead 114 as a second input to AND gate 104 and the output of threshold limit sensor-3 is connected through lead 115 as a second input to AND gate 105. Lead 90 is connected to lead 91 as the output lead of AND gate 104. Lead 96 is connected as the output lead of AND gate 105 to lead 95. Output leads 116 and 117 from electronic switch-2 92 are connected as the inputs to the power amplifier 118. A common 119 provides the common return for the control signals. The output of electronic switch-2 92 conducted through lead 116 enables the amplifier 118 to energize permeance control section 67 through a lead 121 and return by lead 122. Lead 117 conducts the enabling signal for the amplifier 118 to provide the energizing current to permeance control section 123 in reactor 66 through a lead 124 and return by the common return 122.

In the power circuit between the direct current power source 72 and the first reactor winding 68 is connected a power circuit breaker 125. Two power leads 126 and 127 connect power source 72 to power circuit breaker 125. Also connected to power circuit breaker 125 is a lead 128 which is connected as the output of the circuit breaker logic circuit 111. The power circuit breaker 125 is connected to the first reactor winding 68 through lead 129 and is connected to the return side of the power circuit through lead 131.

Within the power circuit breaker 125 is provided a third, specially modified reactor having its reactor winding connected in series with the other two reactor windings in the power circuit and having its permeance control section connected to receive an energizing signal from the circuit breaker logic circuit 111 until de-energization is enabled by the logic circuit 111. The third reactor is modified to contain a built-in source of magnetomotive force which, when the reactor permeance is abruptly increased, produces an induced voltage in the reactor winding that opposes the direct current line voltage. This third reactor is then used to momentarily reduce the current in the power circuit to zero during switching of circuit breaker operations.

The permeance control section 67 and 123 can be any of the species shown in FIGS. 2, 3, 4, or 5 of my related U.S. Pat. No. 4,020,440, or a simpler device capable of switching the permeance of the flux paths. No progressive, apportioned control is required as in the other devices described in that specification.

The commutated reactors of FIG. 1 operate to oppose an overcurrent in a direct current power circuit. This is accomplished by the commutated inductive reactors 65 and 66 in producing an average counter electromotive force to reduce the average current in the power circuit. So long as the current in the line is within predetermined limits, reactors 65 and 66 produce no reaction from the control system. The only effect that the control system has on the power circuit at such time is the introduction of the small resistance of the reactor windings 68 and 73. However, when the current in the power circuit exceeds a predetermined value, the control system will respond to reduce and limit the current in the power circuit to a safe, predetermined value. This is accomplished by controlled counter electromotive forces produced alternately in reactor windings 68 and 73. Undesired excessive current in a power circuit is, therefore, reduced by the average bucking voltage produced by the combined action of the reactors. With the current in the power circuit thus limited, the undesired affects of overload or short circuit conditions are eliminated. The current is brought into safe limits until the decision is made, within the control circuitry 78, to either remove the control if the overcurrent disappears or open the power circuit if the overcurrent persists.

Variations in the current level in the power circuit are sensed by current sensor 75. The output voltage of sensor 75 is compared, in the threshold limit sensor-1 85, with a preset threshold voltage selected to establish the current limit in the power circuit. In the circumstance where a transient overcurrent can be tolerated, an external control 79 can supply a threshold voltage level change through lead 81 to override the internal preset threshold. Within threshold limit sensor-1 85 a delay means requires that the overcurrent persist for a predetermined time, usually very short, before the output signal therefrom is produced to activate the control system. This is to inhibit control operation resulting from normal power circuit transients. Also, the external control 79 can initiate a command signal that can energize the logic circuit 111 to effect a direct current switching operation as desired.

When the voltage level from the power circuit current sensor 75 rises above the established threshold in the threshold limit sensor-1 85, the output of sensor 85 applied to junction 87 becomes a signal that enables five events to occur:

1. The state of electronic switch-2 92 is reversed by signals applied through steering diodes 89 and 94,
2. Electronic switch-1 98 is turned on,
3. The AND gates 104 and 105 are enabled by the turn-on of electronic switch-1 98,
4. Timing generator 107 is started by a signal applied through connector 106 from turned-on electronic switch-1 98, and
5. Circuit breaker logic circuit 111 is activated.

For Event 1, the trigger signal output of threshold limit sensor-1 85, applied to junction 87, is directed through strap, steering diodes 89 and 94 and applied as inputs to electronic switch-2 92 to reverse the state thereof. Just prior to such reversal, the output of electronic switch-2 92 over leads 116, 117, to amplifier 118 provides energization current to the respective permeance control sections 67 and 123. In such prior time, electronic switch-2 92 has turned on, for example, the output lead 117 and turned off output lead 116. Amplifier 118 has responded by supplying energization current through leads 124 and 122 to energize permeance control device 123 of reactor 66 to reduce its permeance to its minimum value. Since lead 116 has been turned off, output leads 121 and 122 do not carry energizing current to permeance control section 67 in reactor 65. The flux state in reactor 65 is at this prior time at its maximum value as determined by the current in reactor winding 68.

Event 1, the change of state of electronic switch-2 92, is also a reversal of the output energizing current from amplifier 118 to newly energize, for example, permeance control section 67 in reactor 65. This reduces the permeance of reactor 65 to its minimum value. The energy stored in reactor 65 is substantially dissipated through winding 69 and rectifier 74. Winding 69 and rectifier 74 minimize the amplitude of induced voltage in winding 68 resulting from the collapse of the magnetic field in winding 68. A reverse connected rectifier across the terminals of winding 68 will further suppress the induced reverse transient voltage. Reactor 65 is now prepared for the next commutation cycle. Reactor 66 at Event 1 has its permeance control section 123 de-energized through leads 124, 122 from amplifier 118 wherein permeance in reactor 66 abruptly increases to its maximum value. This enables the buildup of flux in reactor winding 73 resulting from the power current passing therethrough. The initial rise in flux causes a counter electromotive force to be built up in reactor winding 73 and a corresponding reduction in current in the power circuit, the accomplishment sought after in this invention. Beyond this initial point, the induced voltage in reactor winding 73 decreases uniformly with the current correspondingly increasing towards its maximum value. Concurrently, the flux density in reactor 66 increases to a predetermined value below the knee of the saturation curve of the magnetic material thereof. Such flux density is sensed by the flux density sensor 82, the output of which is applied as the input to threshold limit sensor 3 113 through lead pair 84.

Event 2, the turn-on of electronic switch-1 98 has for its purpose the enabling of AND gates 104 and 105, which is Event 3, and the turn-on of timing generator 107, Event 4.

Event 3, is the enabling of AND gates 104 and 105 by the turn-on of electronic switch-1 98 through leads 102 and 103, respectively. Two other inputs are applied to the AND gates. The output of threshold limit sensor-2 112 is applied through lead 114 as the second input to AND gate 104 and the output of threshold limit sensor-3 113 is applied through lead 115 as the second input to AND gate 105. In operation, the flux density sensors 71 and 82 respond to the flux conditions of the respective inductive reactors 65 and 66. In the commutation process, a reactor 66, for example, undergoes an increase in flux density from the time of commutation and such increase is sensed by the flux density sensor 82, in this example, concurrently, the permeance of the other reactor, 65 in this example, is reduced to its minimum value and the corresponding flux density is reduced rapidly to a minimum value. The output of the flux density sensor 82 is applied as the input to threshold limit sensor-3 113 and its signal level is compared to the threshold level preset in sensor-3 113. The rise of the signal level above the threshold triggers the generation of and output signal which is applied to AND gate 105 through lead 115. Since AND gate 105 was enabled by Event 2, the output signal from threshold limit sensor-3 113 is applied through leads 96 and 95 as an input to electronic switch-2 92, to reverse its state.

In Event 4, timing generator 107 has for its function the master control of the duration of the commutation operation. The timing generator is started by the turning on of electronic switch-1 98 and continued for a preset interval at the end of which an output signal is generated thereby and is applied as a turn-off input to electronic switch-1 98, thereby halting the commutation operation. The timing function is performed by a digital counter, a capacitor charge timing ramp or other devices well known in the art. The timing interval is set for a period that overlaps a transient overcurrent condition which could be damaging to connected equipment without the protection offered by this control system.

Event 5, the activation of the circuit breaker logic circuit 111 receives an input signal which turns on an internal logic switch. An internal timing generator which enables the receipt of a second input signal, will reset the internal logic switch if, for example, a second input signal is not received within a preset interval. On the receipt of a second and, for example, a third input signal within this preset interval, conditions are established for the actuation of the operation of the circuit breaker 125 through lead 128. An alternative operation of circuit breaker logic 111 would be to alter the number of cycles arbitrarily to meet the needs of the power circuit conditions in specific applications.

With respect to the illustration in the time sequence chart shown in FIG. 2, the load current is sensed by load current sensor 75 beginning at its normal operating level followed by a transient overcurrent rise 132 to the current threshold level preset in threshold limit sensor-1 85. The dotted line 133 indicates the level of the current which would be reched without the control system of FIG. 6. However, the solid extension following rise 132 drops instantly to a new low level over path 66S by the onset of an inductive reactive effect of the commutating reactor 65 through winding 68, for example, and rises again proportional to the flux buildup in reactor 65. The flux density sensor 71 produces a proportional output that rises until the threshold in limit sensor-2 is reached. Upon the arrival at the said sensor-2 threshold, an output signal is produced by sensor-2 which passes through the enabled AND gate 104 to reverse the state of electronic switch-2 92 with the result that the energization of permeance control 67 is turned on to reduce the core permeance and the energization of permeance control 123 is turned off to elevate the permeance of the core of reactor 66. The energy stored in the core of reactor 65 at the instant of its reduction in permeance is largely dissipated through the resistances of the reverse transient suppressor winding 69 and rectifier 74 by the induced high level of transient current. In this way, the core is rapidly reduced to a near unmagnetized state with a minimum of reaction in the reactor winding 68.

A portion of this stored energy may be used advantageously in an alternative structural configuration in which a common section of the magnetic core is shared by the two reactors, such as the center leg of a three-legged core. In this case the windings of the two reactors are phased to alternate the flux polarity in the common core section. The stored energy in the common core section serves to enhance the generated counter electromotive force during the commutated switching.

The current waveform segment 66S shown on the time sequence chart in FIG. 2 is a repeated reduced current transition similar to that previously described but now generated by reactor 66. As before, the abrupt increase in the permeance of the near unmagnetized core of reactor 66 initiates a rise in flux generated by the magnetomotive force produced by reactor winding 73 and the direct current circuit current. Concurrently, by self-induction, a counter electromotive force is produced, resulting in a drop of direct current circuit current, as illustrated. Beyond the initial rise in flux in reactor 66 the corresponding induced counter electromotive force in winding 73 is reduced from its initial value along a typical exponential path as a function of time, with a corresponding increase in direct current circuit current. The rise of flux in the core of reactor 66 is sensed by flux density sensor 82 and continues to a preselected value below the knee of the saturation curve for the core material. At this level of flux density, flux density sensor 82 actuates threshold limit sensor-3 114 to reverse electronic switch-2 92 through AND gate 105, to continue the commutating reactor process. This commutating process continues until terminated by the output 99S from timing generator 107 which turns off electronic switch-1 98 disabling AND gates 104 and 105 to disable the recycling feedback and, therefore, return the system to a standby condition, provided the direct current power circuit current has returned to its normal operating level. This means that the system is in standby, waiting for the next overcurrent sense trigger 85S from threshold limit sensor-1 85.

With reference to the time sequence chart shown in FIG. 3, the operation of the embodiment of FIG. 1 under sustained overcurrent conditions is described. The circuit breaker logic 111 provides for the accumulation of a preset number of actuating signals before the Event 5, actuation of such logic circuit 111, such actuating signals being generated by threshold limit sensor-1 95. This is the condition during a sustained overcurrent in the direct current circuit. FIG. 3 shows two operations of switch-1, 98S and 98SS, during which the overcurrent condition persists. After this period, a third signal 98SSS from the threshold limit sensor-1 95 is received by circuit breaker logic 111, which, in this example, is preset to activate a circuit breaker actuation 111S on the third input signal. During the said actuating signal 111S, two events occur. With respect to power circuit breaker with reactor 125 as shown in FIG. 1, at Event 1, the reactor in 125, which includes a built-in source of magnetomotive force, is actuated by the removal of actuating current from its permeance control winding to rapidly elevate the permeance of the reactor core. The effect of this action is to generate a counter electromotive force to oppose the direct current circuit source voltage and, thereby reduce to zero, or near zero, the direct current circuit current at the instant the circuit breaker contacts separate for the Event 2. The operation of the circuit breaker with reactor 125 can be independently operated by an external manual or automatic actuation for the purpose of direct current circuit switching under normal load current conditions and for the purpose of diminishing or eliminating the circuit breaker contact arcing normally associated with direct current circuit switching.

A single reactor structure of FIG. 1 can be modified for continuous progressive inductance variation by automatic electronic means by controlled activation of the winding of the permeance control section. This configuration is useful in a shunt for controlled supression of the transient rise in line voltage during load changes or line switching.

High power direct current transmission and distribution systems are critically dependent upon reliable, effective, and nondeteriorating circuit protection and switching gear. Responsive to this need, this invention applies permeance controlled reactors in a programmed sequence to protect against destructive transient overcurrent by controlled reactively induced counter voltages in the power circuit. For a sustained overcurrent, a circuit breaker operation is initiated coincident with a momentary suppression of the circuit current by a specially configured permeance switched reactor controlled within the programmed sequence. For routine switching functions, the same components are used and actuated by a separate circuit.

I claim:
1. In combination,
   a pair of commutated inductance reactor means for current limiting in a direct current power circuit,
   said reactor means of identical inductance,
   conductor means wound on said reactors in series with said direct current power circuit,
   feedback control means connected to said power circuit and coupled to each of said reactors,
   said feedback control means produce a commutated permeance in the magnetic cores of said reactors when the direct current exceeds a limit controlled by said feedback control means,
   said resulting commutated permeance in the magnetic cores of said reactors produces a net average impedance to dynamically reduce the direct current below said limit.
2. The combination of claim 1 and means to break the input power in the event of an overcurrent.
3. The combination of claim 1 and means to reduce the input current power to zero when switching of said direct current is desired.
4. An electromagnetic induction means for the control of a direct current power circuit comprising,
   a first and a second identical variable permeance closed magnetic path means,
   a first electromagnetically coupled permeance control means in said first variable permeance closed magnetic path means,
   a second electromagnetically coupled permeance control means in said second variable permeance closed magnetic path means,
   a first load current winding surrounding said first variable permeance closed magnetic path means,
   a second load current surounding said first variable permeance closed magnetic path means,
   a second load current winding surrounding said second variable permeance closed magnetic path means,
   a direct current circuit breaker means including a magnetic transformer means,
   a current sensing means,
   a load terminal means,
   means for serially connecting said direct current circuit breaker means, said first load current windig, said second load current winding, said current sensing means and said load terminal means,
   a first reverse transient suppression means having a third winding means surrounding said first variable permeance closed magnetic path, a first unidirectional current flow and electrical energy absorbing means,
   means for serially connecting said third winding means, said first unidirectional current flow and electrical energy absorbing means,
   a second reverse transient suppression means having a fourth winding means surrounding said second variable permeance closed magnetic path, a second unidirectional current flow and electrical energy absorbing means,
   means for serially connecting said fourth winding means, said second unidirectional current flow and electrical energy absorbing means,
   a load current sensing voltage feedback means,
   a threshold load current limit sensor means, means connecting said feedback means between said current sensing means and said threshold load current limit sensor means, a first and a second electronic switch means, each having a first and a second input means and a first and a second output means, said first electronic switch also having a timing pulse output means, a direct current circuit breaker decision circuit means, a timing generator means, a first and a second diode means, a means connecting the output of said threshold load current limit sensor means to the anode of each of said diode means, to said first input of said first electronic switch means and to said decision circuit means, a means connecting the output of said decision circuit means to said cirect current circuit breaker means, a means connecting said timing pulse output means to said timing generator means, a means connecting the output of said timing generator means to the second of said input means to said first electronic switch, a first and a second flux density sensor means, a first and a second threshold voltage level detector and signal generating means, means coupling said first flux density sensor means to said first variable permeance closed magnetic path means, means coupling said second flux density sensor means to said second variable permeance closed magnetic path means, means connecting the output of said first flux density sensor means to said first threshold voltage level detector means, means connecting the output of said second flux density sensor means to said second threshold voltage level detector means, a first and a second logic AND gating means, a first and a second trigger connecting means, a means connecting the output of said first threshold voltage level detector means as one of the inputs to said first logic AND gating means, a means connecting the output of said second threshold voltage level detector means as one of the inputs to said second logic AND gating means, a means connecting the first output of said first electronic switch means as the second input to said first logic AND gating means, a means connecting the second output of said first electronic switch means as the second input to said second logic AND gating means, said first trigger connecting means connected to the cathode of said first diode means, to the output of said first logic AND gating means, and to the first input of said second electronic switch means, said second trigger connecting means connected to the cathode of said second diode means, to the output of said second logic AND gating means, and to the second input of said second electronic switch means, a commutation amplifier means, a means connecting said first output of said second electronic switch means as the first input of said commutation amplifier means, a means connecting said second output of said second electronic switch means as the second input of said commutation amplifier means, the switching output means of said commutation amplifier means connected as the input means for said first and second variable permeance control means, the output of said commutation amplifier means switched between the inputs of said first and second electromagnetically coupled variable permeance control means to effect a minimum permeance state in one and a maximum permeance state in the other of said first and second variable permeance control magnetic paths and produce thereby on continued switching of said commutation amplifier an average counter electromotive force to reduce the said load current to a controlled operating limit, an override control means to provide external actuating means, means connecting said override control means to said threshold load current limit sensor means, said threshold load current limit sensor means providing an output of control signals upon the occurrence of a current level above the level established within said threshold load current limit sensor, upon the receipt of a predetermined number of said control signals, said direct current circuit breaker decision circuit means produces an output signal to provide said magnetic transformer means therein momentary load current suppression means coincident with the operation of said direct current circuit breaker means.

* * * * *